July 13, 1948.   J. MULLER   2,445,234
VELOCITY INDICATOR
Filed May 31, 1939
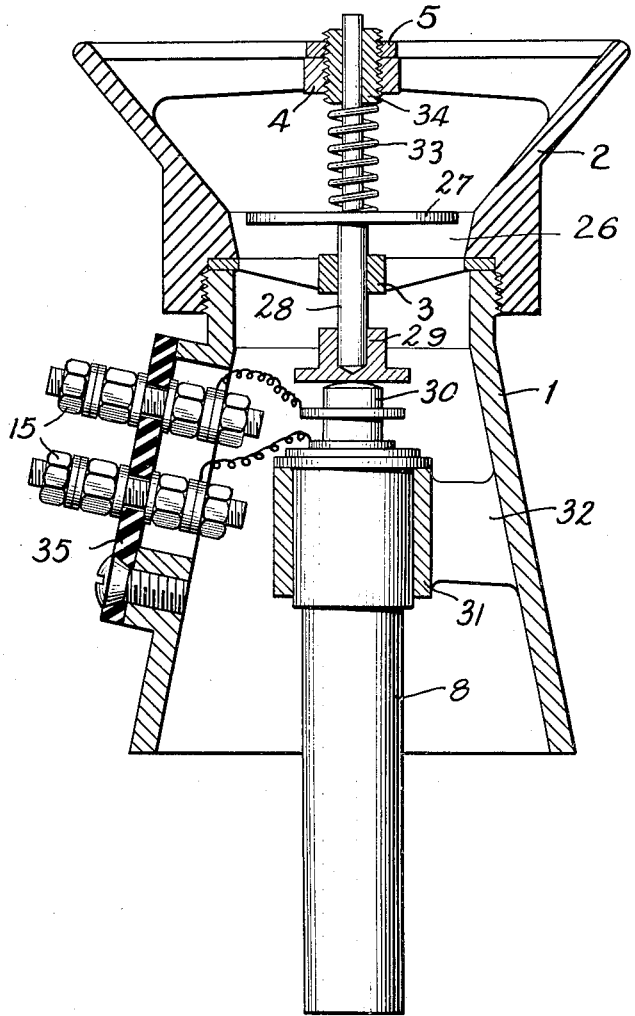
INVENTOR
JACQUES MULLER,
BY Young, Emery & Thompson
ATTORNEYS Patented July 13, 1948

2,445,234

UNITED STATES PATENT OFFICE 2,445,234

VELOCITY INDICATOR

Jacques Muller, La Garenne Colombes, France

Application May 31, 1939, Serial No. 276,713
In France May 31, 1938

Section 3, Public Law 690, August 8, 1946
Patent expires May 31, 1958

2 Claims. (Cl. 201—51)

1

This invention relates to velocity indicators for indicating the velocity of flow of a fluid and more particularly has reference to such a device for indicating the velocity electrically.

An object of this invention is to provide an indicator apparatus for indicating the velocity of flow of a fluid which includes a converging-diverging tube, the neck of which is partially closed by a disc, a carbon pile resistance, and means for transmitting movements of said disc to variations in pressure in the carbon pile to vary the resistance of said pile so that the displacements of said disc can be electrically measured.

Another object of this invention is to provide a device for measuring the velocity of flow of a fluid which comprises a converging-diverging tube having a disc positioned to partially close the neck of said tube, a carbon pile resistance positioned axially of said tube, a spring urging said disc to closed position against the flow of fluid to be measured, and means connecting said disc with one end of said carbon pile resistance whereby displacements of said disc can be electrically measured by variations in resistance of said carbon pile.

These and other objects of the present invention will appear more fully hereinafter in the description and from the showing in the drawing.

In the drawing the single figure is an axial sectional view of a fluid flow velocity indicator constructed in accordance with the present invention.

As shown in the drawing, the velocity indicator according to the present invention comprises a converging-diverging tube member having a lower converging member 1, an upper diverging member 2, the throat or neck of said converging-diverging member 1, 2 is partly closed by a disc 27 which is carried by a rod 28 slidably mounted in a boss 3 supported by elements extending radially inwardly from the throat of said tube. The upper portion of the rod 28 is of reduced cross section and slidably extends through an externally threaded sleeve 34 which is threadedly mounted in an internally threaded boss 4 supported in the upper portion of the diverging tube 2.

The lower end of the rod 28 carries an abutment 29 which engages against the pusher rod 30 of the carbon pile 8. At this point, it will be noted that the carbon pile, which consists of a plurality of juxtaposed discs, is carried in a tube, one end of which is supported in a sleeve 31 carried by inwardly extending arms 32 which in turn are supported by the converging tube 1.

2

A compression coil spring surrounds the upper portion of rod 28 of reduced cross section with its lower end engaging the disc 27 and its upper end engaging the lower end of the externally threaded sleeve 34.

Since the sleeve 34 is mounted in the boss 4 for axial adjustment therein, it serves to vary the force exerted by the spring 33 on the disc 27 and on the carbon pile. A lock nut 5 surrounds the upper portion of the sleeve 34 and serves to lock said sleeve in adjusted positions.

In operation, the disc 27 is adapted to be displaced by the flow of fluid through the tube 1, 2 against the force of the spring. This, in turn, will displace the movable element of the carbon pile so that the pressure exerted by the spring on the carbon pile will vary in relation to the velocity of flow through the tube 1, 2.

The variations in the displacement of the disc 27 and the movable element of the carbon pile can be indicated by placing the carbon pile in an electrical circuit so that the variation in resistance thereof can be indicated. For this purpose, the terminals of the carbon pile are connected to terminals 15 which are carried by an insulating covering member 35 mounted on the lower tube 1.

Having described my invention, what I claim is:

1. A velocity indicator comprising a converging-diverging flow tube supporting arms extending across the interior of the tube, a rod axially slidably mounted in bosses carried by said arms, a disc lying in a plane perpendicular to and carried by said rod and movable axially of the tube toward and away from the portion of the tube of smallest diameter, a spring urging the disc toward the portion of the tube of smallest diameter, said disc being adapted to be displaced by the flow of fluid through the tube against the force of the spring, and a carbon pile having a movable element positioned in contact with one end of the rod so that the spring will compress the carbon pile and the pressure exerted by the spring on the pile will vary in relation to the velocity of fluid flow through the tube.

2. A velocity indicator comprising a converging-diverging flow tube supporting arms extending across the interior of the tube, a rod axially slidably mounted in bosses carried by said arms, a disc lying in a plane perpendicular to and carried by said rod and movable axially of the tube toward and away from the portion of the tube of smallest diameter, a spring urging the disc toward the portion of the tube of smallest diameter, said disc being adapted to be displaced by the flow of fluid through the tube against the force of the spring, a carbon pile having a movable element positioned in contact with one end of the rod so that the spring will compress the carbon pile and the pressure exerted by the spring on the pile will vary in relation to the velocity of fluid flow through the tube, means for varying the pressure exerted by the spring, and means for locking the spring pressure varying means in adjusted positions.

JACQUES MULLER.

REFERENCES CITED

The following references are of record in the file of this patent:

UNITED STATES PATENTS

| Number | Name | Date |
|---|---|---|
| 747,157 | Fahrney | Dec. 15, 1903 |
| 808,562 | Milton | Dec. 26, 1905 |
| 865,304 | Harrison | Sept. 3, 1907 |
| 1,214,745 | Beard et al. | Feb. 6, 1917 |
| 1,335,238 | Hopkins | Mar. 30, 1920 |
| 1,426,735 | Hendry | Aug. 22, 1922 |
| 1,528,627 | Peters | Mar. 3, 1925 |
| 1,567,940 | Gramberg | Dec. 29, 1925 |
| 1,581,320 | Pumprey | Apr. 20, 1926 |
| 1,581,957 | Keller | Apr. 20, 1926 |
| 1,635,040 | Fales | July 5, 1927 |
| 1,822,203 | Collins | Sept. 8, 1931 |
| 1,859,765 | Burleigh | May 24, 1932 |
| 1,861,021 | Martin | May 31, 1932 |
| 1,907,608 | Subkow | May 9, 1933 |
| 1,921,624 | Lewis | Aug. 8, 1933 |
| 2,019,058 | Rippe | Oct. 29, 1935 |
| 2,030,523 | Keller | Feb. 11, 1936 |
| 2,060,316 | Hoesel | Nov. 10, 1936 |
| 2,096,571 | Williams | Oct. 19, 1937 |

FOREIGN PATENTS

| Number | Country | Date |
|---|---|---|
| 102,203 | Germany | May 21, 1899 |
| 130,044 | Great Britain | July 31, 1919 |
| 139,217 | Switzerland | June 16, 1930 |
| 191,194 | Great Britain | Jan. 11, 1923 |
| 362,797 | Germany | Nov. 1, 1922 |
| 426,957 | Germany | Mar. 22, 1926 |
| 452,171 | Great Britain | Aug. 18, 1936 |
| 663,521 | France | Apr. 9, 1929 |
| 705,669 | France | Mar. 16, 1931 |
| 828,920 | France | Mar. 7, 1938 |